(12) United States Patent
Kurtzweg et al.

(10) Patent No.: US 12,004,580 B2
(45) Date of Patent: Jun. 11, 2024

(54) FLAT-KNITTED OUTDOOR CLOTHING AND METHOD FOR MANUFACTURING SAME

(71) Applicant: KJUS North America, Inc., Boulder, CO (US)

(72) Inventors: Kenneth Kurtzweg, Oberägeri (CH); Nico Serena, Risch (CH); Isabel Rosa Müggler Zumstein, Zürich (CH); Françoise Adler, Bern (CH)

(73) Assignee: KJUS North America, Inc., Boulder, CO (US)

( * ) Notice: Subject to any disclaimer, the term of this patent is extended or adjusted under 35 U.S.C. 154(b) by 1570 days.

(21) Appl. No.: 16/093,547

(22) PCT Filed: Apr. 12, 2017

(86) PCT No.: PCT/EP2017/058816
§ 371 (c)(1),
(2) Date: Oct. 12, 2018

(87) PCT Pub. No.: WO2017/178542
PCT Pub. Date: Oct. 19, 2017

(65) Prior Publication Data
US 2019/0125018 A1    May 2, 2019

(30) Foreign Application Priority Data

Apr. 13, 2016 (CH) .......................................... 484/16

(51) Int. Cl.
*A41D 31/102* (2019.01)
*A41D 3/00* (2006.01)
(Continued)

(52) U.S. Cl.
CPC ............. *A41D 31/102* (2019.02); *A41D 3/00* (2013.01); *A41D 31/065* (2019.02);
(Continued)

(58) Field of Classification Search
None
See application file for complete search history.

(56) References Cited

U.S. PATENT DOCUMENTS 3,723,055 A * 3/1973 Hooper .................... D06P 1/22
 8/644
5,584,737 A * 12/1996 Luhtala .............. A41D 13/0125
 2/2.5
(Continued)

FOREIGN PATENT DOCUMENTS

DE  2857399 C2  5/1986
FR  2131852 A1  11/1972
(Continued)

OTHER PUBLICATIONS

International Search Report; PCT Application No. PCT/EP2017/058816; dated Oct. 19, 2017.
(Continued)

*Primary Examiner* — Jenna L Johnson
(74) *Attorney, Agent, or Firm* — Polsinelli PC (57) ABSTRACT

A garment is provided which includes a flat-warp-knitted fabric laminate made of at least one flat-warp-knitted fabric. The flat-warp-knitted fabric includes a polyurethane film which is stretchable in substantially all directions. A knit fabric made of fleecy thread may be adhesively bonded to the film and be positioned between the film and the inner lining. The garment can be made up of five tailored flat-warp-knitted laminate pieces: three flat-warp-knitted laminate pieces for the two front sides and the rear side of the torso, and two flat-warp-knitted laminate pieces for the two sleeves. The seams form the two sleeve cuffs, and the seams are sewn onto the flat-warp-knitted laminate pieces for the torso. The front pieces are sewn together, and the rear side of the torso piece is positioned along the side of the torso by (Continued)

a respective seam. The seams are used to connect these parts along the shoulders.

16 Claims, 11 Drawing Sheets

(51) Int. Cl.
*A41D 31/06* (2019.01)
*A41D 31/18* (2019.01)
*B32B 5/02* (2006.01)
*B32B 7/12* (2006.01)
*B32B 27/12* (2006.01)
*B32B 27/40* (2006.01)
*D04B 21/20* (2006.01)
*A41D 31/12* (2019.01)
*A41D 31/14* (2019.01)

(52) U.S. Cl.
CPC ............ *A41D 31/185* (2019.02); *B32B 5/026* (2013.01); *B32B 7/12* (2013.01); *B32B 27/12* (2013.01); *B32B 27/40* (2013.01); *D04B 21/207* (2013.01); *A41D 31/125* (2019.02); *A41D 31/14* (2019.02); *A41D 2400/10* (2013.01); *A41D 2500/10* (2013.01); *B32B 2262/0261* (2013.01); *B32B 2262/0276* (2013.01); *B32B 2307/304* (2013.01); *B32B 2307/712* (2013.01); *B32B 2437/00* (2013.01); *D10B 2331/04* (2013.01); *D10B 2401/02* (2013.01); *D10B 2403/0112* (2013.01); *D10B 2501/04* (2013.01)

(56) References Cited

U.S. PATENT DOCUMENTS

| | | | | |
|---|---|---|---|---|
| 6,339,845 | B1 * | 1/2002 | Burns | ................. A41D 27/285 |
| | | | | 2/243.1 |
| 9,457,205 | B2 * | 10/2016 | John | ........................ B32B 5/26 |
| 2002/0119300 | A1 * | 8/2002 | Taylor | ..................... B32B 25/10 |
| | | | | 428/312.8 |
| 2005/0208857 | A1 | 9/2005 | Baron et al. | |
| 2012/0288662 | A1 * | 11/2012 | Conolly | .................. A43B 7/125 |
| | | | | 428/221 |
| 2016/0039174 | A1 | 2/2016 | Wu | |
| 2016/0339664 | A1 * | 11/2016 | Gallagher | ................. B32B 7/12 |

FOREIGN PATENT DOCUMENTS

| | | | | |
|---|---|---|---|---|
| WO | 2015087053 | A1 | 6/2015 | |
| WO | WO-2015087053 | A1 * | 6/2015 | .......... A41D 27/245 |
| WO | 2016007878 | A1 | 1/2016 | |
| WO | 20170178542 | A1 | 10/2017 | |

OTHER PUBLICATIONS

English Translation of International Search Report; PCT Application No. PCT/EP2017/058816; dated Oct. 19, 2017.
Written Opinion of PCT Application No. PCT/EP2017/058816; dated Oct. 19, 2017.
English Language Abstract of FR2131852; Retreived From www.espacenet.com On Sep. 27, 2018.
English Description of DE2857399; Retreived From www.espacenet.com On Sep. 27, 2018.

* cited by examiner

FLAT-KNITTED OUTDOOR CLOTHING AND METHOD FOR MANUFACTURING SAME

CROSS-REFERENCE TO RELATED APPLICATIONS

This application is a national stage entry of PCT/EP2017/058816 filed Apr. 12, 2017, which claims priority to Swiss patent application 00484/16 filed on Apr. 13, 2016, the contents each of which are hereby incorporated by reference in their entirety.

The present invention relates to garments for wearing outdoors, which as a special feature are made of flat-warp-knitted fabrics. Garments that are worn outdoors should in particular provide protection from the weather, i.e., should be air- and water-tight in rain, snow, and heavy wind, and still allow water vapor to pass through. In addition, in low outside temperatures the garments should preferably keep the wearers of the garments warm, but also allow perspiration under physical exertion, so that the perspiration given off by the wearer can evaporate to the outside. All of these requirements should be met with garments that are preferably lightweight and comfortable to wear, and that preferably do not restrict freedom of movement. In the ideal case, such a garment should be worn like a "second skin" which is virtually not felt at all.

These requirements may be best illustrated with reference to ski jackets. Very different effects act on jackets. When skiers are riding on a ski lift, they are physically inactive, and at the same time are often exposed to low temperatures and biting winds. In this case the ski jacket should above all provide protection from cold. On the other hand, relatively high temperature and humidity may prevail in the ski area, and when skiers are skiing, their body temperature immediately rises and cooling via perspiration begins. However, this perspiration is less effective when the water vapor that is produced cannot penetrate the material of the ski jacket. Thus, it is apparent that very different requirements are imposed on a ski jacket, depending on the temporary, variable situation. Moreover, a ski jacket should preferably be lightweight and provide the highest degree of freedom of movement. This freedom of movement is the single most important property that leaves much room for improvement compared to conventional ski jackets. The athletic activity of skiing requires active movement of the torso in order to raise and lower the upper body and to rotate and twist the torso. On the other hand, the jacket should provide preferably little restriction and resistance for arm movements when using a pole or pushing off with two polies. Jackets made of woven materials have proven to be relatively stiff for this purpose. More or less the same applies for all jackets for other types of sports, such as golf jackets, for which strong twisting of the upper body on the one hand, and swinging of both arms on the other hand, is required when teeing off. These movements are impeded by conventional jackets. The tighter the fit of such a jacket, made of inelastic fabric, on the upper body and the arms, the greater the restriction of freedom of movement. Depending on the use, the same applies for pants and other garments that are worn outdoors. Here as well, freedom of movement is a key concern, in particular when physical activities are to be performed when wearing these garments. Lastly, there are fashion considerations such as the cut, color, textile structure, pattern, and various accessories for such jackets.

Ski jackets have been manufactured and worn for decades, and in principle the requirements imposed on them have remained the same, as described above. Such ski jackets have been, and continue to be, made of woven textile material. Various woven materials are used that are made of different fiber threads, preferably synthetic fibers, and woven material parts are sewn together and assembled to form a three-dimensional jacket or pants. Woven parts made of polyester threads are used on the inner side as a lining. Thus, jackets are usually made up of one or two rear parts, at least two front parts, and two sleeves, each of which is sewn together from a flat piece of material by rolling into a sleeve and subsequently sewn onto the material pieces that surround the torso. The woven textile materials are generally not elastic, or if so, only to a limited extent. In light of the fact that a lining is sewn onto the inner side of the jacket, and the jacket also contains a filling, made of a thermally insulating material, under the lining, it is apparent that the jackets noticeably restrict the freedom of movement of the wearer. When the arms are held at shoulder height and then rotated backwards and forwards, this restriction is quickly and distinctly felt.

An athletic jacket having an outer layer made of a flat-warp-knitted fabric would remedy this problem, since such knit fabrics are dense, lightweight, durable, run-proof, and structurable in a variety of ways. A flat-warp-knitted fabric does not have fraying cut edges, and has a product design with less seams. However, it is very questionable whether such a flat-warp-knitted fabric can also meet all other requirements for an athletic jacket. It is not without reason that no athletic jacket having such an outer layer has thus far appeared on the market or been described in the literature.

WO 2015/087053 (Sealskinz Ltd., GB) from the prior art is worthy of mention. This international application concerns the manufacture of a breathable waterproof garment for wearing outdoors, during recreational activities, and when playing sports. However, there is no specific disclosure of such a garment anywhere in the document; rather, the document deals only with production of the structure of various laminates. A knitted outer side (or also an inner side, or both), among other things, is disclosed. Lastly, a stretchable, breathable, waterproof woven fabric or knitted fabric having a plurality of layers is claimed. However, a laminate with a flat-knitted fabric as the outermost layer is not described, and at no place in this document does the term "flat-knitted fabric" appear.

US 2016/039174 A1 (Wu Kun-Hai, TW) discloses a layered structure for garments that is designed for better heat retention, breathability, and water-tightness. A warp-knitted textile material in combination with a polyurethane layer is proposed. This involves clothing that is stuffed with feathers, and in one embodiment is made of knitted textile or warp-knitted textile. However, no flat-warp knitted textile material, i.e., a laminated or layered structure with a flat-warp-knitted fabric, is disclosed or mentioned.

FR 2 131 852 A (Piel Michel, FR) from 1971 relates to garments for mountain climbing and winter sports, which as an essential component contains cellular rubber, better known as sponge rubber or neoprene, which allows the additional textile layers to have a very thin design. A polyurethane layer is also mentioned. The term "flat-warp-knitted fabric" (tricot de chaîne à deux lits in French) does not appear in this document.

WO 2016/007878 A1 (Cohesive Systems LLC, US) mentions the term "knit," as well as an intermediate layer made of polyurethane. A garment having a knit pattern, more precisely, a rib knit pattern, is described. This pattern provides a three-dimensional surface texture for the garment. However, the primary focus is on the manufacture of socks, and nowhere is the use of a flat-warp-knitted fabric for an athletic jacket mentioned or suggested. The specific term "flat-warp-knitted fabric" is not mentioned in any of the prior art documents mentioned above.

Knit fabrics (also referred to as knitted fabrics or knitted goods) are materials made of thread systems, and are commercially manufactured by stitch formation on a knitting machine. Knit fabrics belong to the knitwear category. A distinction is made between weft-knit fabrics and warp-knit fabrics. For example, undergarments, drapery fabrics, lace, netting, as well as velvet and plush, for example, are made from knitted textiles. Knitted and knitwear are included in the category of knitted goods, in which one thread loop is looped into another thread loop. In knitting or crocheting, however, one stitch is made next to the other. The thread runs horizontally along a stitch row, while in knitted goods the thread forms stitches one on top of the other. The thread runs vertically, and together with the adjacent thread forms a stitch wale. Knitted goods are manufacturable only by machine. Garments for wearing outdoors and in particular ski jackets, of course, have thus far never been constructed with an outer layer made of knitwear or knitted goods, due to the fact that these goods have not been provided with the necessary weather resistance. This is proved by the factual history. If this garment construction had been obvious for the industry, such ski jackets would have been on the market for many years, in light of the compelling advantages of this design, which may be demonstrated by the garments developed in the present patent application.

Against this background, the object of the present invention is to provide garments for wearing outdoors, which compared to those previously known restrict the mobility of the wearer to a noticeably lesser degree, i.e., provide greatly increased wearing comfort, due to the fact that the garment is hardly noticed by the wearer with regard to restriction of movement. Furthermore, the aim is to allow these garments to be made of fewer, specifically adapted parts and assembled with fewer seams, so that the manufacturing process is greatly simplified, and more latitude is provided with regard to the design of the product shape as well as the textile structured surfaces and functions. The aim is for certain areas in the parts to be assembled to meet specific requirements, such as having a different structure in places or providing increased stress resistance, or providing increased or vapor permeability in certain places for "breathing." The aim is for the garments to still have thermal insulation that is at least the same as or even better than for conventional garments, and to have overall water vapor permeability. A further aim is that the garments are significantly lighter than comparable conventional outdoor garments.

This object is achieved by a garment for wearing outdoors, which is made up of a single part or is sewn together from multiple parts, each being made of a flat-warp-knitted fabric laminate, and the laminate being made from a flat-warp-knitted fabric that is manufactured on a flat-warp-knitting machine, wherein the flat-warp-knitted fabric forms the outer shell of the garment, followed by a waterproof but vapor-permeable, adhesively bonded film, stretchable in all directions, that adjoins this flat-warp-knitted fabric on its inner side, and further inwardly, optionally followed by a knitted fabric or mesh fabric made from fleecy thread as thermal insulation, or with no such thermal insulation, and at the innermost location, a flat or circularly knitted or flat-warp-knitted inner lining, which in the absence of a thermal insulation layer is adhesively bonded directly to the polyurethane film or is suspended inside the garment, or if a knitted fabric or mesh fabric is present, the inner lining, as thermal insulation, is suspended on same or fastened thereto, either detachably, or fixedly by seams or stitches.

The object is further achieved by a method for manufacturing a garment for wearing outdoors, whose single part or whose multiple parts are each made of a flat-warp-knitted fabric laminate, wherein a) a flat-warp-knitted fabric is knitted on a flat-warp-knitting machine for the entire garment, b) a waterproof but vapor-permeable film that is stretchable in all directions is applied to this flat-warp-knitted fabric by full-surface gluing, c) the cutting pattern parts needed for producing the desired garment are cut out from this laminated material, d) a knitted fabric or mesh fabric made from fleecy thread is optionally applied to these cutting pattern parts, on the side of the film, by gluing at selected points or over the entire surface, or such a knitted fabric or mesh fabric is omitted, e) when a knitted fabric or mesh fabric is omitted, an inner lining made of flat or circularly knitted or flat-warp-knitted or woven textile material is applied directly to the film, or otherwise is applied to the knitted fabric or mesh fabric by stitching at selected points, or continuous sewing, or by detachable connections, f) in the case of multiple parts, these cutting pattern parts are sewn together to form the garment.

Such a garment is described in greater detail below with reference to a ski jacket, and the individual steps for manufacturing the garment are clarified and explained with reference to cutting pattern pieces.

In the figures:

FIG. 5:

shows the ski jacket, made of this material laminate and completely assembled from these five parts, with the seams necessary for this purpose;

The invention breaks new ground, in that for the first time, a flat-warp-knitted fabric is used as the base material for the outer shell of garments for outdoor use, namely, for athletic jackets such as winter sport jackets, in particular ski or golf jackets, mountain climbing jackets, hiking jackets, riding jackets, and similar recreational apparel, for the upper body, as well as for garments designed as pants. The technological basis for producing flat-warp-knitted fabric goods is the use of knit and stitch combinations which are characteristically made of multiple threads. Entire systems of threads from various origins are joined together to form stitches. The structural basis of these knitted goods is the stitch formation. For this reason, knitted goods are also known as knitwear, but differ from the knitted products. Knit fabrics may be manufactured in various ways. The products from the manufacturing process may be categorized in two different forms, firstly in the form of a textile tube, and secondly in the form of a flat textile material, known as piece goods. In commercial textile manufacturing, the tube is also known as double Raschel knitted fabric, and the piece goods are also known as flat fabric or warp knitted fabric or Raschel knitted fabric. Knit fabrics are generally multi-thread systems, which differentiates them from conventional knitted products. For warp knitting, the machine operates with one or more thread chains made up of a number of differently sized threads. For the stitch formation, the individual chain threads are placed around the needles. The needles are then moved together. Knitted textiles that have been manufactured on a warp knitting machine have a striking feature. The stitch-forming threads run through the fabric in the longitudinal direction, predominantly in a zigzag pattern. As a result, the fabric cannot draw up and is largely run-proof. The numerous knitted fabrics that are created by alternating yarn variations and stitch configurations are used in many spheres of life. A knitted fabric has an average tension force, and is still elastic to a certain degree. The knitted textiles have very little wrinkling, are lightweight, and are characterized by good adjustability of the climate behavior, for example the breathing activity. The knitted materials include, for example, textiles for undergarments and outerwear, terrycloth fabrics, and Nylon hosiery. Materials such as fleece and nicky velour, which are likewise made from knitted materials, have extremely high wearing comfort.

Figure 1:
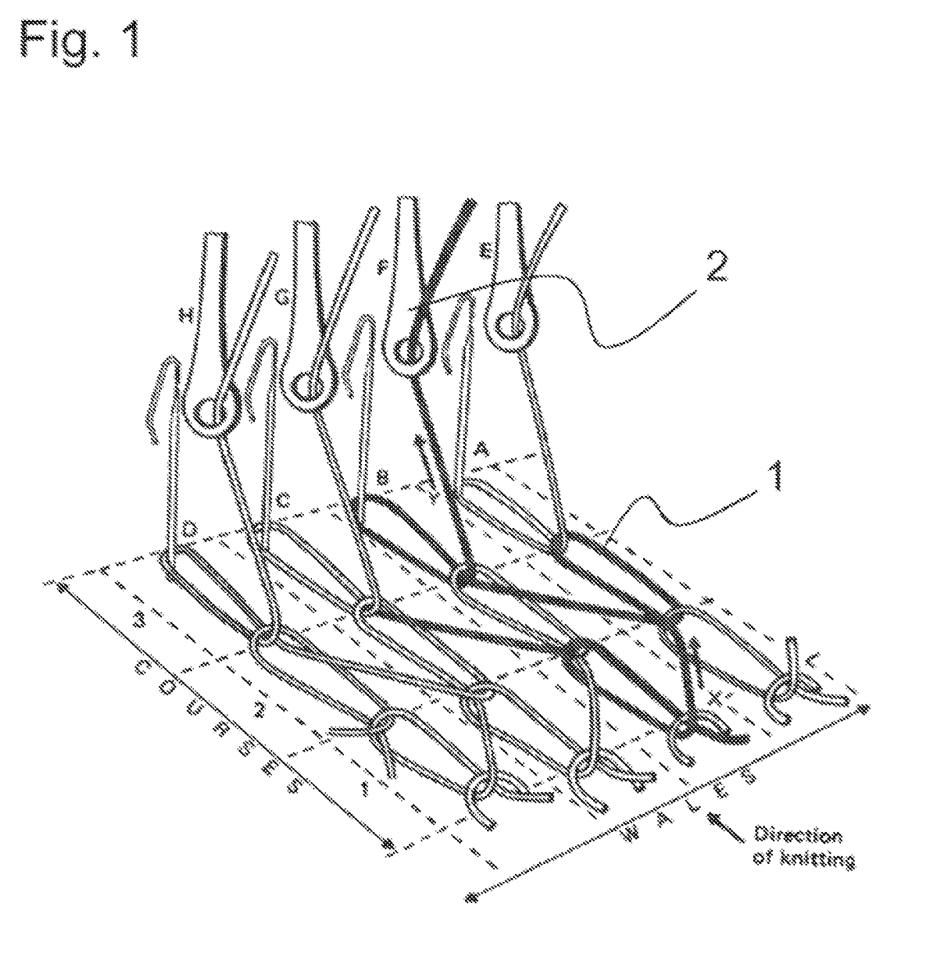
FIG. 1 shows a stitch configuration of a typical flat-warp-knitted fabric.

FIG. 1 shows the stitch configuration of a typical flat-warp-knitted fabric. The thread runs, guided by the knitting eyelet 2 (as illustrated by the thread 1 depicted in black), in a zigzag course along the knit fabric, in the direction of its production. For example, the thread, as shown, follows the adjoining stitch rows in a zigzag pattern instead of forming its own individual row. Due to the multiple complexity, flat knitting is performed practically exclusively by machine, not by hand. Various types of flat-warp-knitting exist. However, all are resistant to runs and relatively easy to sew. An advantage of such a flat-warp-knitted fabric is that it behaves like a knit, but without a knit's disadvantages. It is particularly lightweight and finely meshed but still permeable to air, and in addition is resistant, durable, robust under mechanical stress, soft, and stretchable in all directions. Single parts of such knits, the same as woven materials, may be easily joined together by sewing.

The advantages of flat-warp-knitted fabrics are in particular:

The precise adjustability with regard to stretching/strength and transparency/density.

They offer almost unlimited pattern options, based on the stitch design and free placement of the patterns in the knitted area.

A flat-warp-knitted fabric cannot draw up, and is largely run-proof.

A flat-warp-knitted fabric has no fraying cut edges.

All yarn counts can be processed in a flat-warp-knitted fabric.

A flat-warp-knitted fabric has high elasticity in the transverse and longitudinal directions. According to a test under DIN 53 815, the elasticity of stretching and recovery is compared to woven textiles. In the weft direction, the elasticity of a flat-warp-knitted fabric is, for example, approximately 46% greater than that of the known woven ski garment textile material LY242. This is very significant, since no elastanes are used for this purpose; rather, this elasticity originates solely from the structure of the flat-warp-knitted fabric.

Its elasticity can be adjusted very well, and may also be kept very low, if necessary, by the selection of the yarn and the stitch configuration.

A flat-warp-knitted fabric has a very stable structure and shape despite the high elasticity.

A flat-warp-knitted fabric has high strength.

A flat-warp-knitted fabric is extremely run-proof.

A flat-warp-knitted fabric has a comparatively low mass and is therefore lightweight.

A flat-warp-knitted fabric allows a product design with less seams. A seam is basically a so-called high point in the product design, and thus causes chafing and pressure points during use. In addition, it is possible that the sewing thread in the seam may tear during use. The reduced-seam product design minimizes/eliminates weak points and risks in the product which would result from the use of seams.

Despite these properties, which have been known for many years, thus far no athletic jackets or pants for the outdoors, made from such a flat-warp-knitted fabric, has been manufactured and put on the market, which is actually surprising. Such a knitted fabric most likely would not have had the required weather resistance, so that for decades, conventional athletic jackets such as ski jackets and hiking jackets have been made, almost without exception, from woven textiles, if not from leather or film material for the outer shell. The flat-warp-knitted outdoor clothing presented here thus breaks completely new ground, and opens up a level of wearing comfort thus far unknown. However, the manufacture of the garments is also greatly simplified by the use of flat-warp-knitted fabrics, in that either they may be made up of a single part, or several parts must now be sewn together and the number of seams may be significantly reduced. Furthermore, it is much easier and quicker to convert a flat-warp-knitting machine for a different product than is the case for a weaving machine. Thus, manufacturing such garments from flat-warp-knitted fabric laminates is much more flexible than manufacturing woven garments. The most important special property of a garment made of a flat-warp-knitted fabric laminate is the extremely high wearing comfort, even when the garment lies right against the body. The flat-warp-knitted fabric laminates have a high modulus of elasticity, and the garments manufactured therefrom do not restrict under the stress from body movements; in fact, they are hardly even felt, and there is little change in their close fit due to movements of the body.

Figure 2:
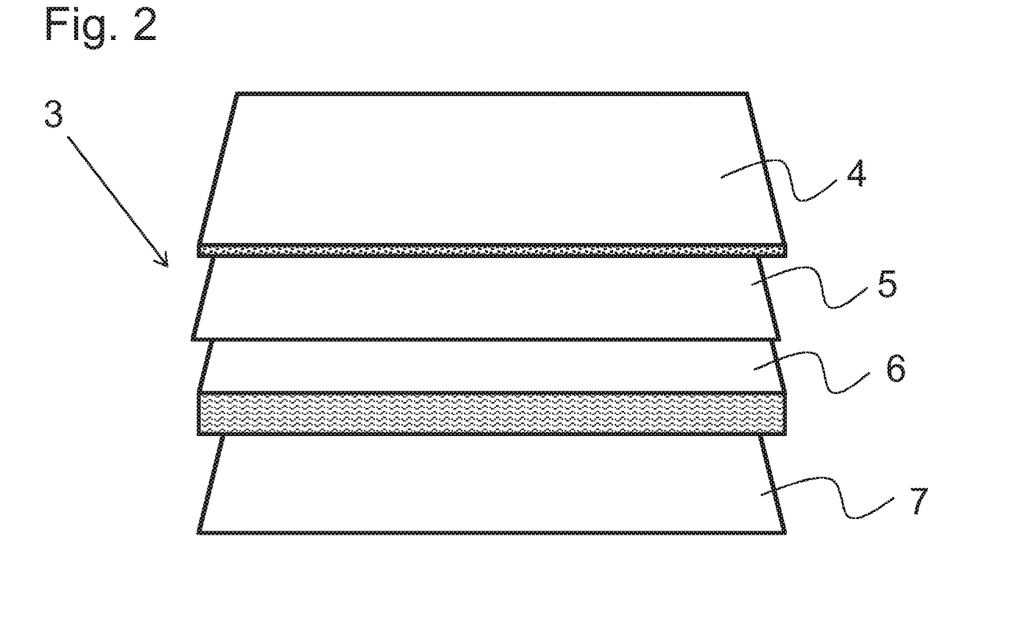
FIG. 2: shows the design of the material laminate together with a flat-warp-knitted fabric for manufacturing a thermally insulating garment, in an exploded drawing.

To manufacture a garment made from a flat-warp-knitted fabric for the outer shell, the flat-warp-knitted fabric, which comes off the machine as a web, is initially processed to form a laminate, which on the one hand reduces the air permeability but still ensures vapor permeability and thus, breathing activity and transpiration ability for the wearer, and on the other hand ensures a high level of comfort on the body. For this purpose, a laminate design 3 as illustrated in FIG. 2 is used. In particular for a ski jacket, which is intended to provide good thermal insulation, such a laminate 3 is firstly composed of the flat-warp-knitted fabric 4 for the outer shell. For example, a flat-warp-knitted fabric 4 made of a polyester/cationic dyed (PES/CD) thread combination or a polyamide/elastane (PA/EL) fiber combination is suitable. Following the flat-warp-knitted fabric toward the inside is a film 5 that is stretchable in all directions, and which on the one hand is waterproof and on the other hand is vapor-permeable, and thus ensures good breathing activity of the laminate 3. This film 5 makes the laminate 3 watertight, so that the garment does not let wetness through, even under persistent rain. A polyurethane film, for example, is suitable as a film 5, although other film materials with similar properties are suitable as well. The polyurethane film 5 conforms to the flat-warp-knitted fabric 4 over its entire surface, and results in little change to its bending and stretching capability. Such a laminate is then available as a roller material, from which the various cutting pattern pieces for manufacturing a specific garment may be cut out and then assembled. The cutting pattern pieces for the particular garment are mechanically cut out or punched out or sawed out, or cut out by laser. A knitted fabric 6 or knitted material made of fleecy thread is subsequently laminated onto the cut-out pieces to complete the laminate on the polyurethane film 5. This knitted fabric 6 or knitted material is 5 mm to 25 mm thick, as necessary, and acts primarily as a heat insulation material, thus providing thermal insulation. Lastly, a circularly or flat knitted or flat-warp-knitted inner lining 7 is sewn onto the free side of this knitted fabric 6 or knitted material, or is fixed with a number of stitches that is just sufficient, which effectively prevents migration of the fibers. The inner lining 7 may also be detachably fastened to the thermal insulation layer with snap buttons or Velcro fasteners. This inner lining 7 is preferably a flat-warp-knitted woolen material made of polyester fibers that transport a mixture of perspiration and moisture (wicking treatment). These fibers transport the moisture from the skin to the other, outer side of the inner lining 7 and knit fabric, where they can evaporate. The knitted fabric 4 for the outer shell, the stretchable polyurethane film 5, and the knitted fabric 6 for the thermal insulation and the inner lining 7 are placed one on top of the other and joined together in such a way that their stretching directions are the same in order to achieve maximum stretchability. This is up to 54% higher than for conventional stretchable fabrics, which is due not to the fibers themselves, but, rather, solely to the structure of the knitted fabric. The inner lining 7 has the greatest stretchability, followed by the polyurethane film 5, and lastly, the knitted fabric 4 for the outer shell. The flat-warp-knitted fabric laminate 3 is finished in this way.

Figure 3:
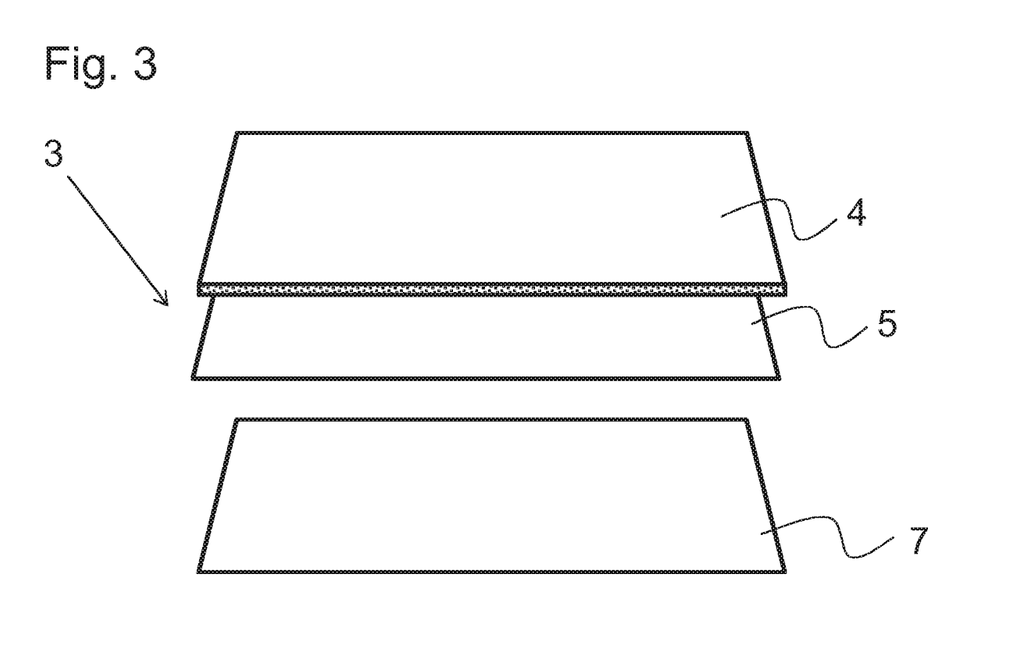
FIG. 3: shows the design of the material laminate together with a flat-warp-knitted fabric for manufacturing a lightweight garment, in an exploded drawing.

FIG. 3 shows a simplified laminate which does not have a specific thermal insulation layer, and which is therefore suited for more lightweight garments. The laminate is made up of the flat-warp-knitted fabric 4 for the outer side of the garment, followed by a film 5 that is stretchable in all directions, and an inner lining 7 that is directly laminated to same. Such a laminate 3 is suitable, for example, for manufacturing all types of pants and lightweight jackets.

The flat-warp-knitted fabrics in each case form the outer shell of a garment. A flat-warp-knitted fabric is several mm thick, and has a feel similar to a close-knit knitted material, i.e., similar to a tightly knitted, thick pullover. In the case of a ski jacket, the flat-warp-knitted fabric 4 is made, for example, of two different polyester fibers (PES fibers), namely, normal PES fibers and cationically dyed fibers (cationic dyed yarn). These fibers take on various colors in the dyeing process, and may thus also achieve a two-tone color effect. This type of coloring is the basis for patterning, which in comparison to printed patterning results from the construction, and therefore is inherently present in the textile surface. This opens up totally new design possibilities. Prior to the processing, the knitted fabric 4 for the outer shell of the garment is made water-repellent via a known process (durable water-repellent (DWR) treatment). The thin polyurethane film 5 that is elastically stretchable in all directions is laminated onto the side of the flat-warp-knitted fabric 4 that is intended for the inner side of the garment. In one variant, the entire laminate may be produced first, i.e., with the thermal insulation layer 6 and the inner lining 7 on the film 5, so that a complete flat-warp-knitted fabric laminate 3 is present for the garment. The necessary parts for a garment to be produced may then be cut out, according to cutting patterns, from such a strip-like laminate 3 having a width of approximately 1500 mm to 2500 mm. This may take place by cutting out by hand, by punching, or by sawing or laser cutting.

Figure 4:
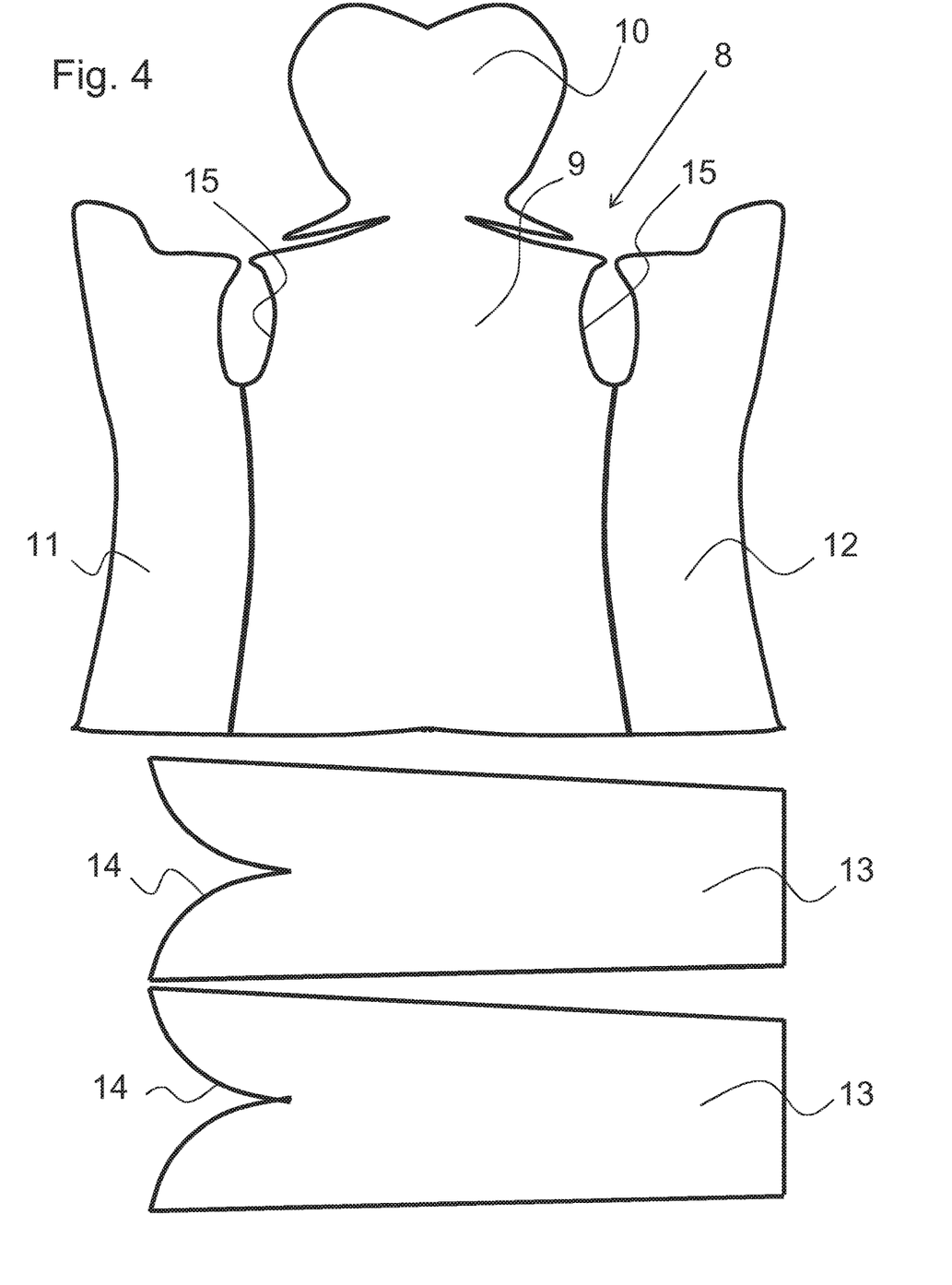
FIG. 4: shows five cut-out cutting pattern parts made of a flat-warp-knitted fabric laminate for manufacturing a ski jacket, illustrated still separated from one another.

FIG. 4 illustrates a first example of finished cut-out laminate parts 9-13, as may be used for assembling an athletic jacket 8. The parts form, first of all, the rear part 9, optionally including a hood 10 which adjoins same in one piece, but which may also be fitted on from one or more separate parts. Two further separate parts 11 and 12, illustrated here in the already sewn-on state, are used for the front part for covering the chest and abdominal area. For the sleeves, corresponding hole edges 15 are provided on these pieces 9, 11, 12. Illustrated below these material parts 9, 11, 12 are the two flat parts 13 for the sleeves of the jacket, with their edges 14 for attachment to the hole edges 15 on the torso part of the jacket 8.

Figure 5:
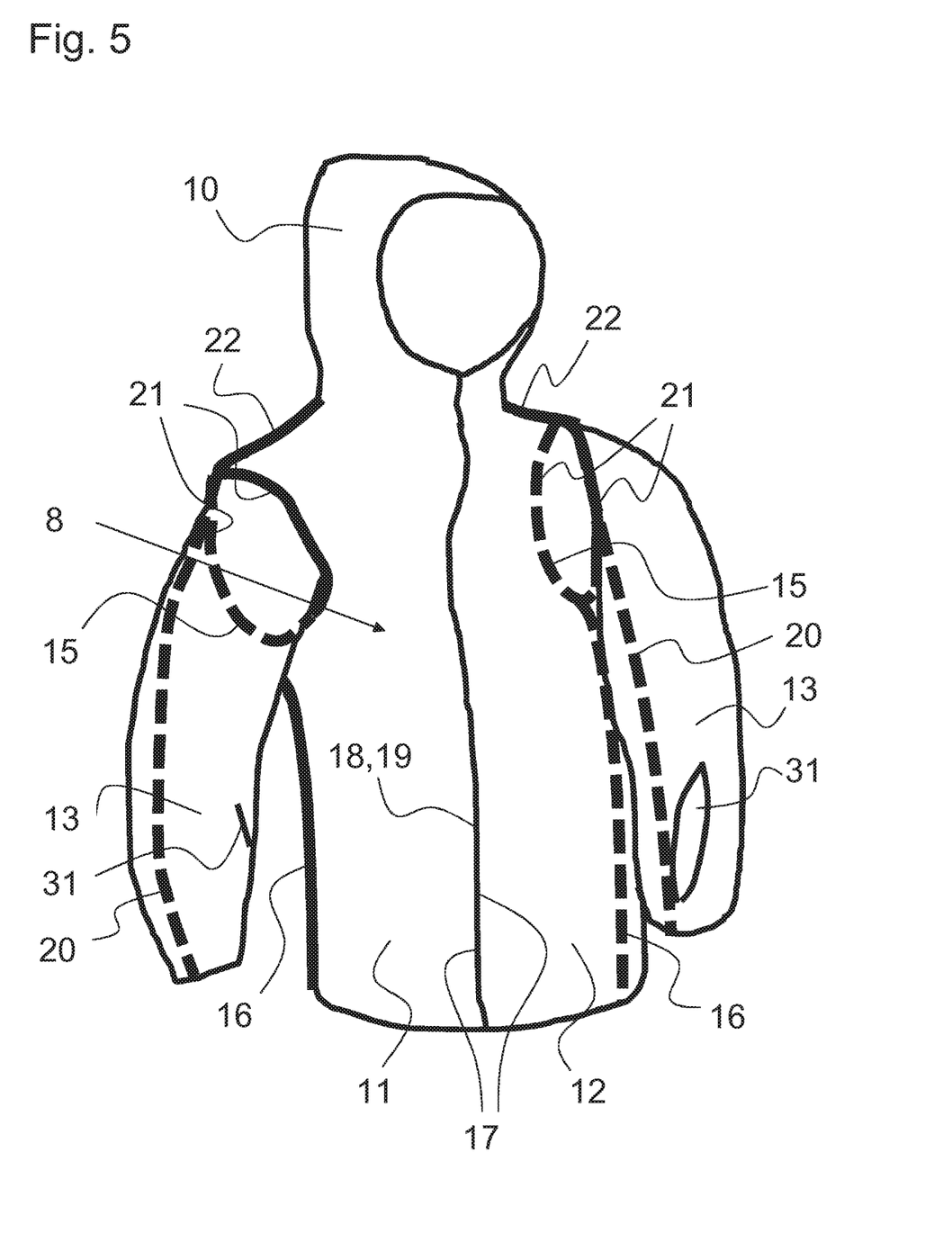

FIG. 5 shows the athletic jacket completely assembled from the parts illustrated in FIG. 4. For sewing the jacket together, first the seams 20 for forming sleeve cuffs are necessary. A lateral seam 16 is then necessary in each case for joining the rear part 9 and the two front parts 11, 12 for surrounding the torso, as well as a seam 22 on each of the shoulders for joining the rear part 9 to the upper edges of the two front parts 11, 12, which cover the chest and abdominal area. A zipper 18 or a Velcro fastener 19 is installed along the two other edges 17 of the front parts 11, 12, which are now opposite one another. A closure having multiple buttons or multiple snap buttons may also be used. Cooling slits 31 on the front sleeves, which are closable with zippers or other closures, are advantageously present, as disclosed in EP 2 934 208 B1. The edges of these cooling slits 31 may contain spring steel wires that spread apart the slits when the zipper is opened. As a result of these slits 31, cool air can penetrate through the entire laminate of the sleeve on the inner side of the forearms of the wearer, which results in a very effective cooling effect due to the blood being locally cooled at that location and subsequently circulated throughout the body and providing overall cooling.

Figure 6:
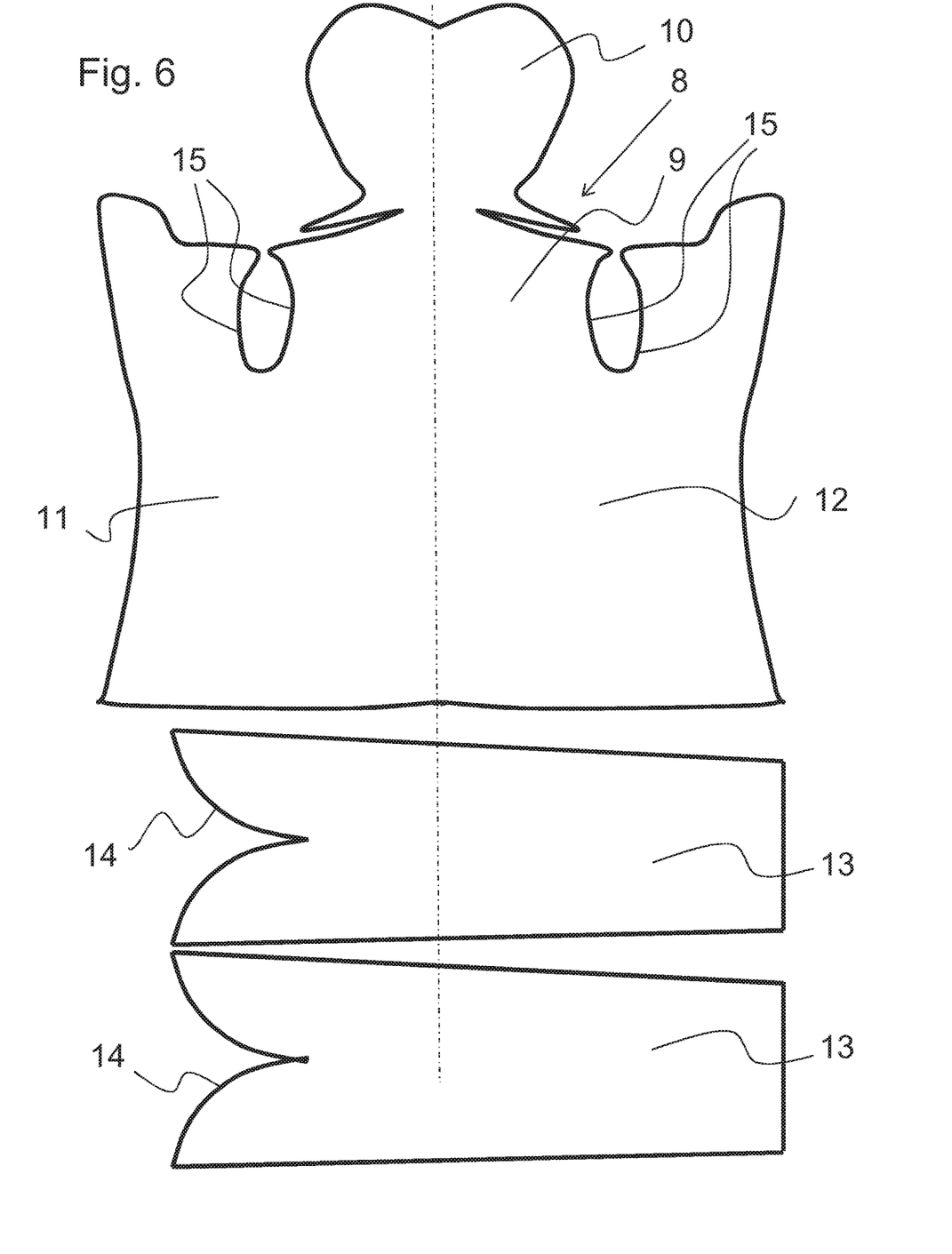
FIG. 6: shows three cut-out cutting pattern parts for manufacturing a ski jacket, illustrated still separated from one another.

FIG. 6 shows a refinement that manages with even fewer seams. In this case, the laminate part that is to surround the torso is made from a single, one-piece part, this part comprising the rear part 9 for covering the back, and the front parts 11 and 12, which then adjoin the rear part in one piece, for covering the chest and abdominal area. This torso part for the ski jacket 8 is likewise equipped with a hood 10, which in the shown example adjoins the rear part 9 in one piece. Apparent once again are the holes with their edges 15 for inserting the two identical sleeve cuffs 13, which are illustrated below the torso piece. These sleeve pieces 13 have curved edges 14 at one of their ends for precisely fitted sewing to the hole edges 15 of the holes on the torso piece. In one special design, these sleeve cuffs may be knitted directly as tubular tubes by the machine, so that a longitudinal seam for producing a sleeve cuff made from a rolled flat laminate piece is dispensed with. In this case, however, the polyurethane film must be inserted on the inner side of the flat-warp-knitted fabric of the sleeve cuffs. For this purpose, a sleeve cuff may be pulled over a molded body onto which the polyurethane film has been previously rolled and externally coated with adhesive. Similarly, a knitted fabric may subsequently be adhesively bonded to the polyurethane film from the inside, and lastly, an inner lining may be sewn on. Alternatively, such a knitted arm cover may initially be turned inside out, with its inner side facing outwardly, and subsequently pulled over a molded body. A polyurethane film may subsequently be adhesively bonded to the flat-warp-knitted fabric from the outside by wrapping the film around the molded body. This is followed by the knitted fabric for the insulation, and lastly, the inner lining. At the conclusion, the outer side is turned to the inner side, and a finished sleeve cuff is obtained from a laminate design.

Figure 7:
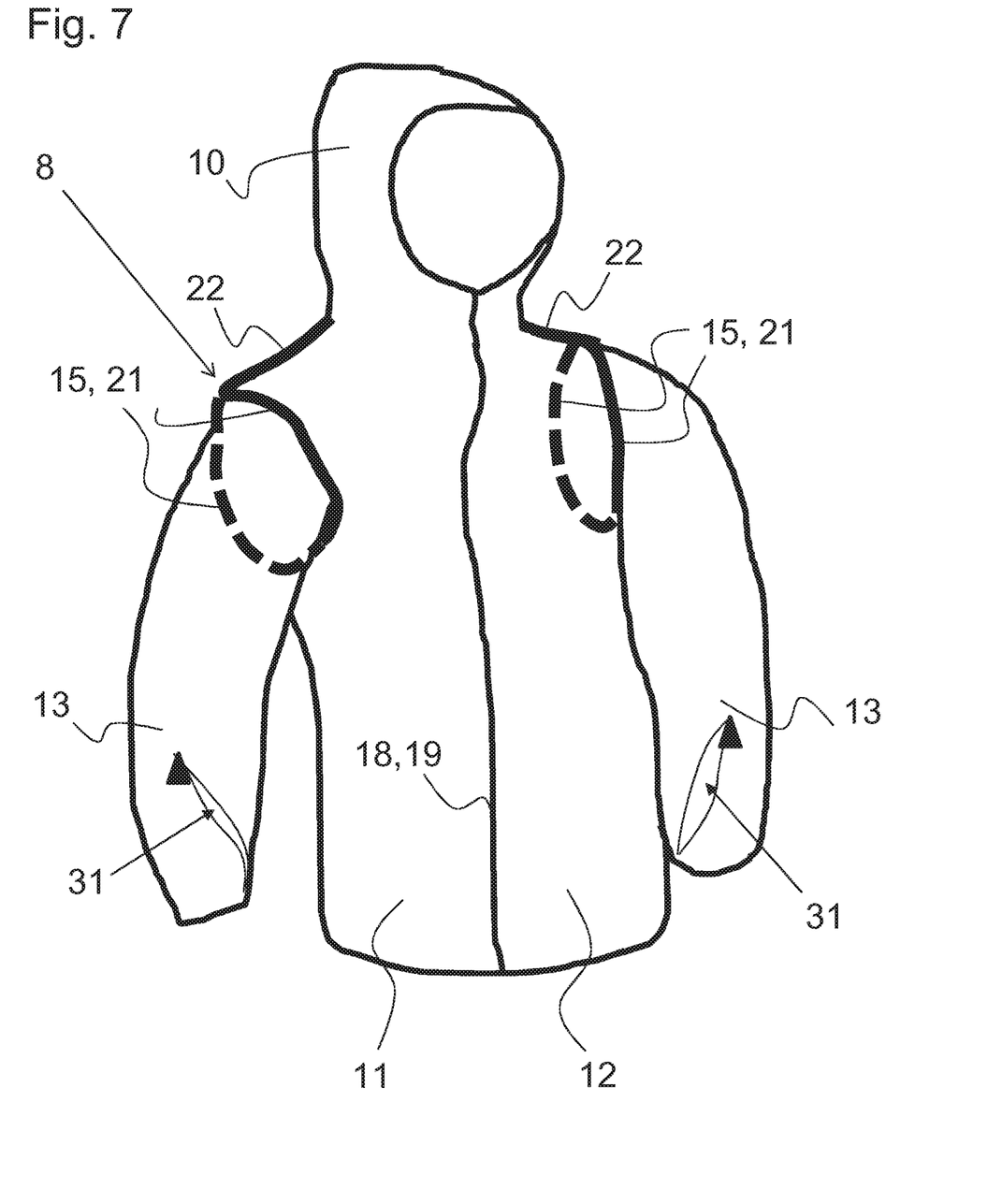
FIG. 7: shows the ski jacket, made of this material laminate and completely assembled from these three parts, with the seams necessary for this purpose.
Figure 8:
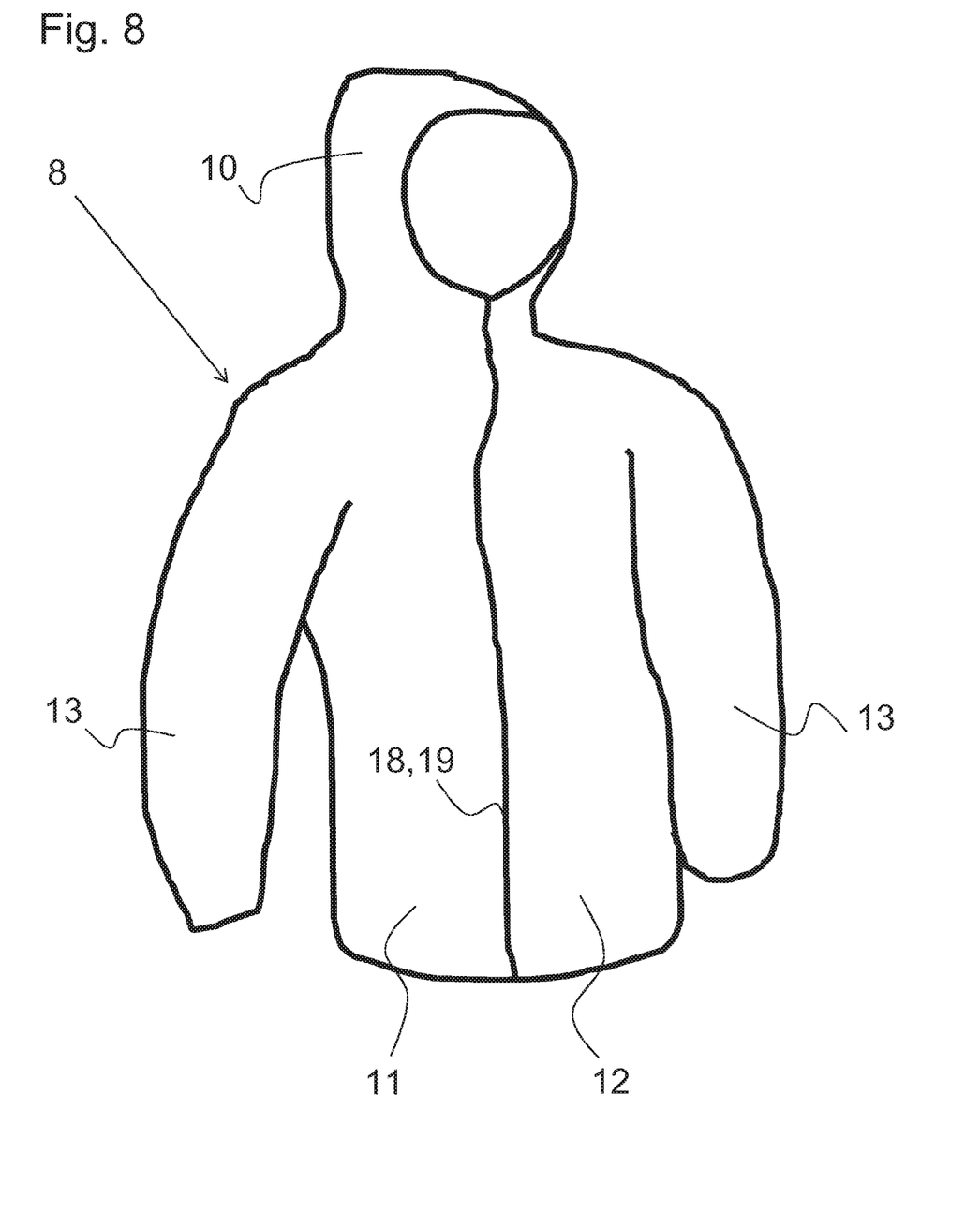
FIG. 8: shows the ski jacket, made up of a single part, that is manufactured from this material laminate.

FIG. 7 shows this athletic jacket or ski jacket 8 with a hood 10 in the assembled state. It is apparent that the single seams 21 required for this purpose are the seams for sewing in the sleeve cuffs 13 into the hole edges 15 on the torso piece, and one seam 22 on each side of the head part, which is guided along the shoulder, and via which the rear part is joined to the front parts 11, 12 which adjoin it on both sides. The two free edges at the front parts 11, 12 are connectable to one another via a zipper 18 or a Velcro fastener 19, or the torso piece is closable in this manner. Button closures or snap buttons may be used instead of these closures. In addition, zippers or other closures may be situated in the front sleeves to provide incrementally openable slits 31, as known from EP 2 934 208 B1. These cooling openings then lead through the laminate, wherein the openings are preferably spanned by a flat-warp-knitted or knitted, and thus air-permeable, material.

When the flat-warp-knitted fabric is manufactured directly as a textile tube by a machine, it is even possible to manufacture a one-piece athletic jacket by knitting a separate tube in each case for the two sleeves and the torso, and joining or knitting together these tubes for the shoulder area of the athletic jacket directly by the machine itself.

Figure 9:
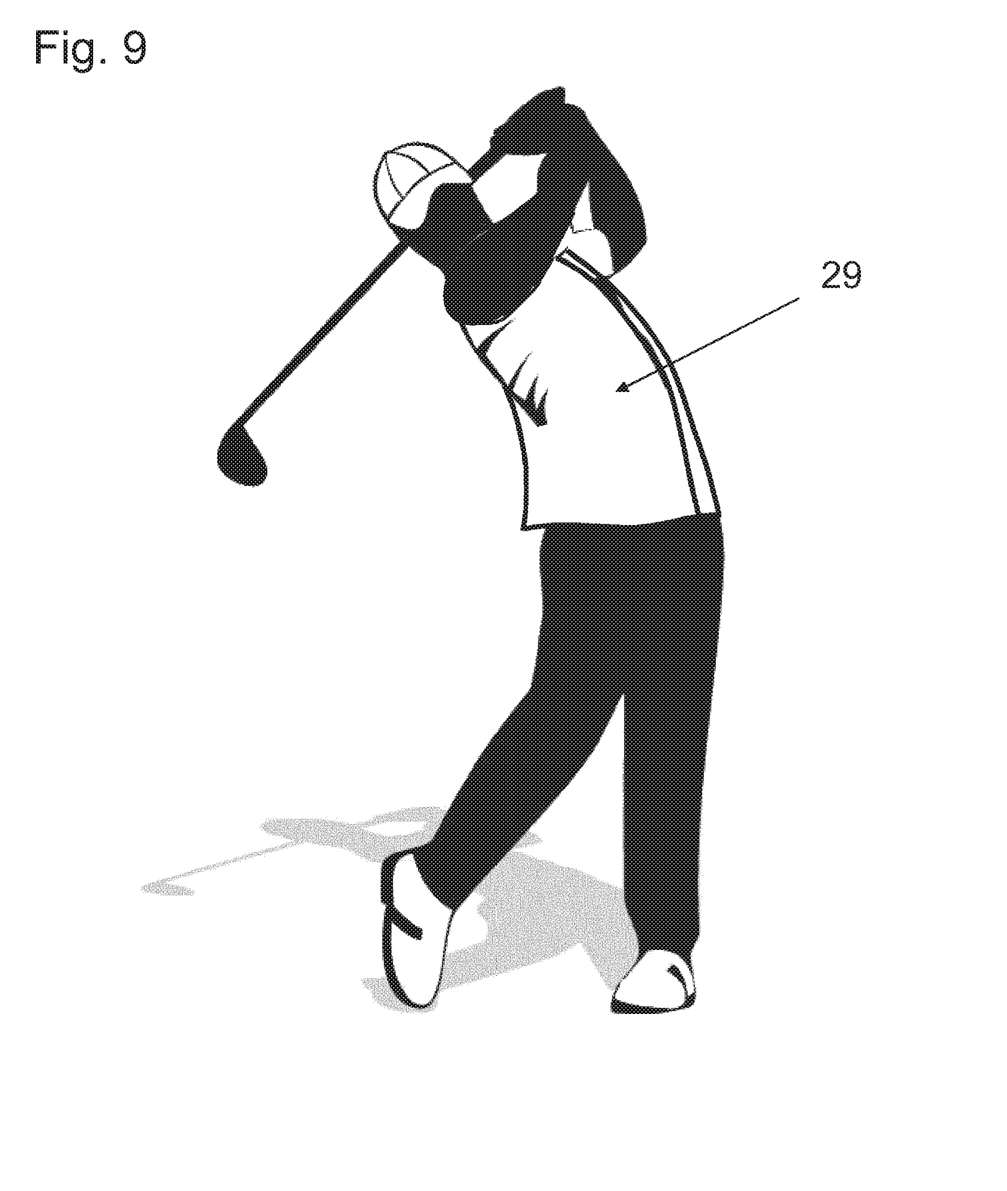
FIG. 9: shows a golf vest manufactured from a single piece of flat-warp-knitted fabric laminate.

For example, vests as worn for golfing and illustrated in FIG. 9 are suitable as further one-piece garments. For performing a golf swing as shown, vests are particularly popular because they have no adverse effect at all on the freedom of movement of the arms. These are sleeveless vests which serve only for protection and heat retention of the wearer's torso. Such vests may be manufactured from a single part, i.e., from a single piece of flat-warp-knitted fabric laminate. The two halves that cover the chest and abdomen are closed in the front, preferably with a zipper, or as an alternative, with button closures or snap buttons. In this case, the light weight of such a vest is its outstanding property compared to conventional vests. In addition, a complete jacket with sleeves that fits closely against a vest is very well suited for playing golf, since there is hardly any noticeable impairment of the freedom of movement.

Figure 10:
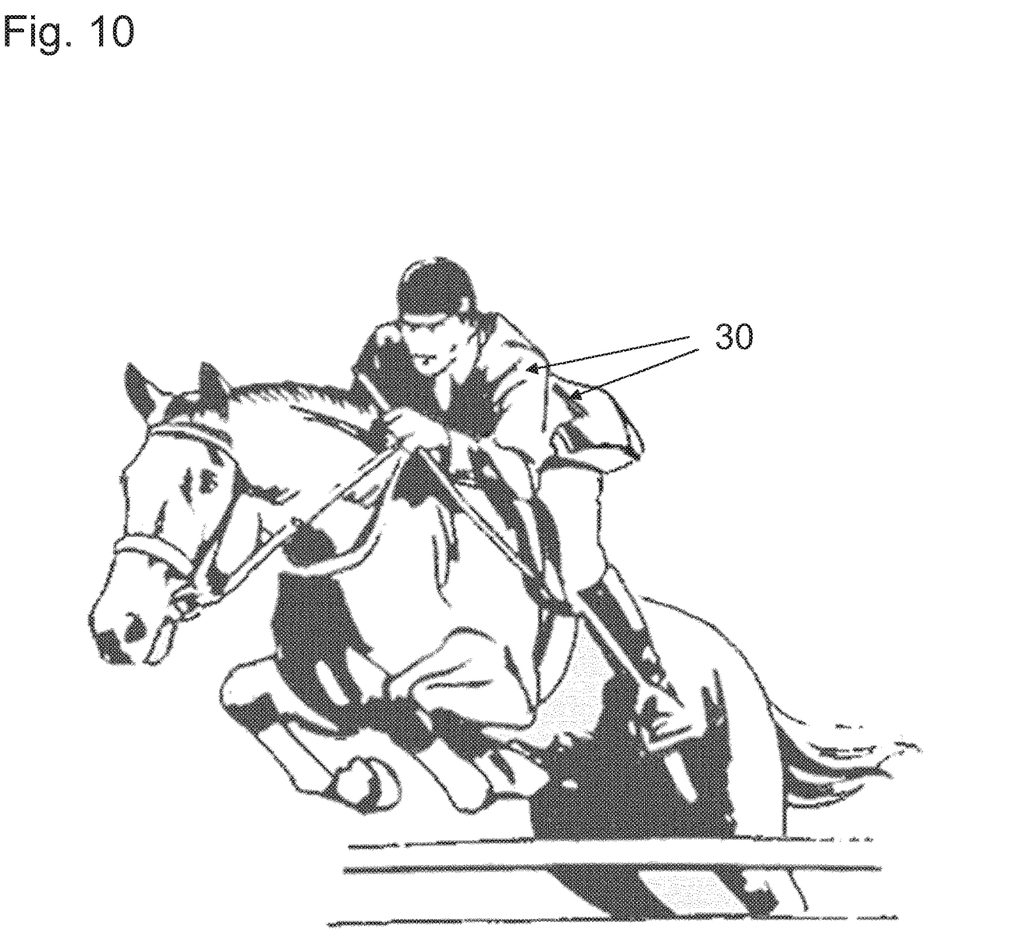
FIG. 10: shows a jumping rider wearing a conventional riding jacket that greatly restricts the rider in the shoulder and upper arm area during each jump.

FIG. 10 shows a jumping rider during a jump, who is wearing a conventional riding jacket. At the locations 30 indicated by the arrows, it is apparent how greatly such a conventional riding jacket made of solid material restricts the rider in the shoulder and forearm area and in the lumbar area, and this occurs during every jump, when the rider must stretch his/her arms forward. This restriction is very effectively eliminated with a riding jacket made from flat-warp-knitted fabric laminate. The rider is able to move the arms as freely as if he/she were wearing just a pullover or a polo shirt. A riding jacket made from flat-warp-knitted fabric laminate may easily be designed in the same way as a conventional jacket, i.e., with the obligatory collar and cut, but offers the rider great advantages, not the least of which is a weight savings, which is important in equestrian jumping.

Figure 11:
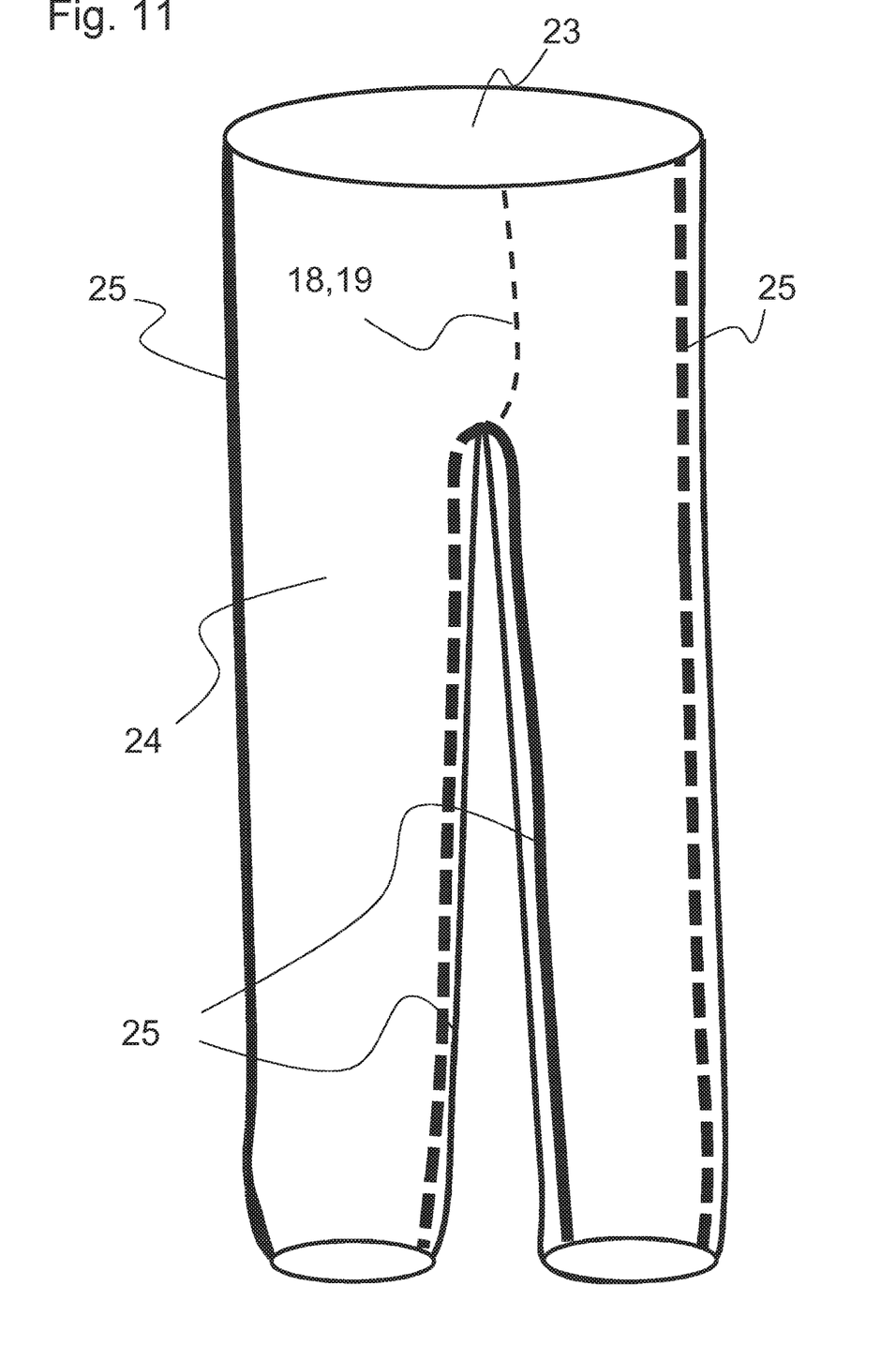
FIG. 11: shows ski pants made from two parts, with a seam on each side along both the inner side and outer side of the pants leg.

FIG. 11 shows a variant for athletic pants or ski pants that are manufactured from a flat-warp-knitted fabric laminate. In the example shown, these pants are made up of only two parts, namely, a rear part 23 and a front part 24. These parts are placed one on top of the other and joined laterally along their edges by the seams 25. In the front, a zipper 18 is sewn in from the waist to approximately the crotch. Instead of a zipper 18, a Velcro fastener 19 or button closures or snap button closures may be used in a known manner.

Figure 12:
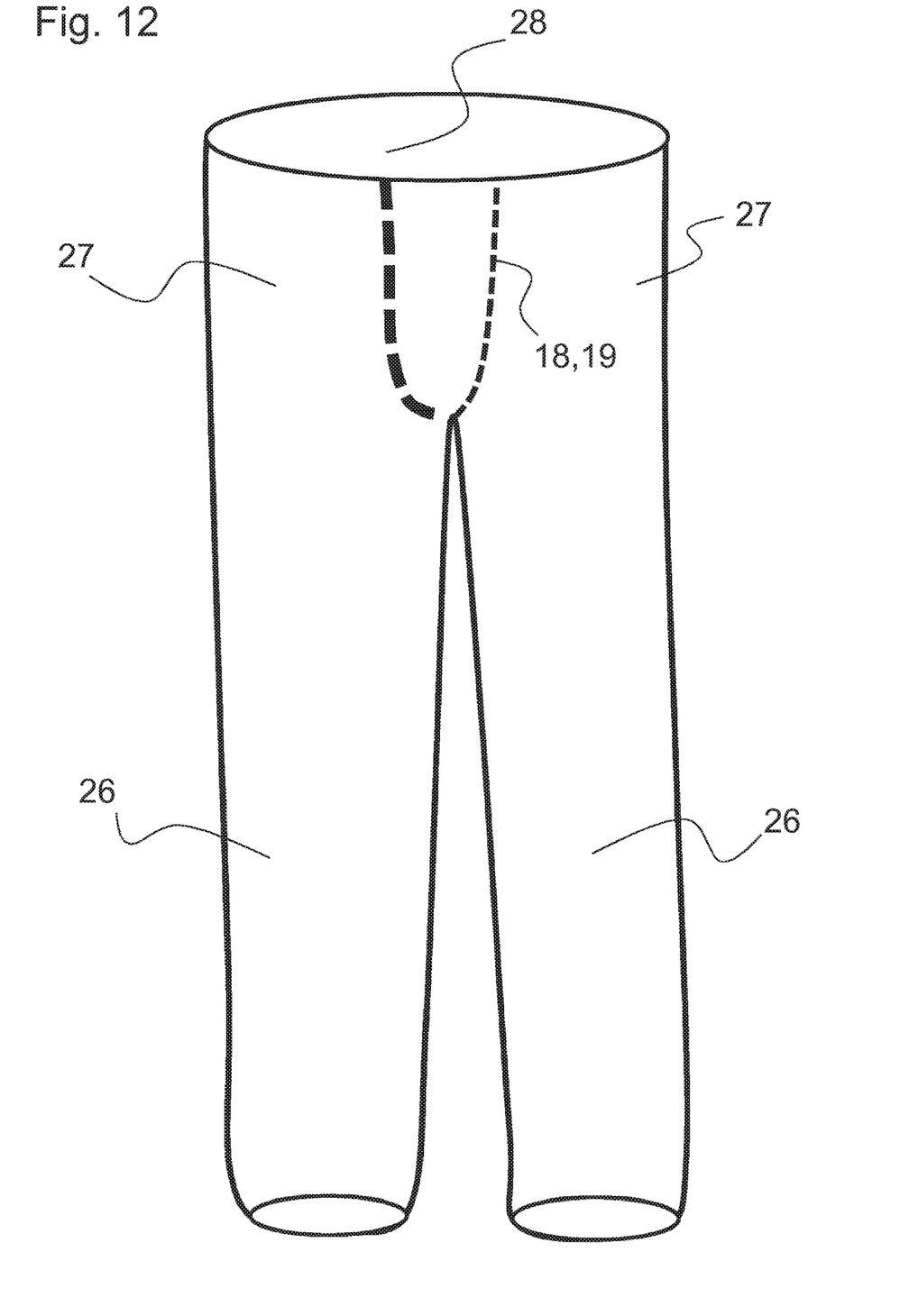
FIG. 12: shows ski pants made of two tubular pants legs made of flat-warp-knitted fabric laminate, and the flat parts adjoining at the top for surrounding the lumbar and waist area, with a single seam along the middle of the seat, and a zipper in front, for the assembly.

FIG. 12 shows alternative pants, which for each pants leg are produced from a single flat-warp-knitted fabric laminate piece by directly manufacturing tubular pants legs 26 by the double Raschel machine. Thus, two tubes come off the machine, and at one end extend in each case into a flat flap 27, the flap 27 being intended for surrounding one side each of the lumbar and the waist area of the wearer of the pants. In this case, the polyurethane film is inserted on the inner side of the pants leg made of double Raschel knitwear by pulling the pants leg over a molded body, onto which the polyurethane film is rolled and externally coated with adhesive. Similarly, a knitted fabric may subsequently be adhesively bonded to the polyurethane film from the inside, and lastly, an inner lining may be sewn on.

Alternatively, such a knitted pants leg may initially be turned inside out, with its inner side facing outwardly, and subsequently pulled over a molded body. A polyurethane film may subsequently be adhesively bonded to the double Raschel knitwear from the outside by wrapping the film around the molded body. This is followed by the knitted fabric for the insulation, and lastly, the inner lining. At the conclusion, the outer side is turned to the inner side, and a finished pants leg is obtained from a laminate design. This single, one-piece flat-warp-knitted fabric laminate is joined by just one seam 28 along the middle of the seat, from the waist down to the crotch, to form pants. In the front, a zipper 18 or a Velcro fastener 19 is inserted along the edges of the two flaps 27 that are still exposed; of course, button closures or snap button closures may also be used.

The method for manufacturing such a garment is described in detail below, using a ski jacket as an example. For manufacturing the outer shell the basic pattern parts, i.e., their contours, are initially determined in standardized form by CAD. These contours remain unchanged, even when the structure or the design of the knitted fabric is altered. The specific structure of the knitted fabric may be selected from a number of various predefined structures. The thread design of these structures determines the stretchability and function of the flat-warp-knitted fabric, and different structures may be placed within the knitted pattern parts. The fibers to be used are determined, for example those with a two-tone color effect, using a mixture of polyester fibers and cationically dyed fibers. For example, five different cutting pattern parts are then determined, which are then assembled by software to form a jacket in 3D. These parts may now be defined for various jacket sizes by reducing and enlarging (nesting). These data are used to control a flat-warp-knitting machine, preferably a flat-warp-knitting machine from Karl Mayer RDPJ having a double-needle bed. These machines can also knit tubes without seams, although the description which follows is limited to flat-knitted parts. The piece goods or flat fabric manufactured on the machine are/is made permanently waterproof using a conventional process. The knit fabrics may optionally be colored with a water-free dye (dry dye coloration). The knitted fabric for the outer shell is then laminated with an elastic polyurethane film that has better stretchability than the knitted fabric. This film, preferably a polyurethane film, has an adequate moisture vapor transmission rate (MVTR) of 10K MVTR or higher. The cutting pattern pieces are cut out from the laminate made of flat-warp-knitted fabric and the film thus adhesively bonded. On the individual cutting pattern pieces, a knitted fabric or mesh fabric made of fleecy thread is applied to the polyurethane film by gluing at selected points or over the entire surface. Lastly, the inner lining to be stitched on is placed on this thermally insulating layer. The inner lining is produced from polyester fiber, optionally with a wool component, on a circular knitting machine. The inner lining is less durable than the knitted fabric for the outer shell, but is stretchable. The inner lining is made moisture-transporting with a specialized treatment (wicking treatment), so that it subsequently transports the perspiration and bodily fluid from the skin side to the opposite outer side by capillary action. The inner lining is mounted on the knitted fabric for the thermal insulation with tacking stitches in order to maintain the stretchability of the overall laminate and prevent migration of the fibers. Care is taken that the stretching directions of all laminate parts are the same in order to achieve maximum stretchability, which is ensured by the structure of the knit fabrics. Lastly, the cutting pattern pieces are cut out as described above and sewn together. All seams are sealed with strips, so that 100% water-tightness is achieved, and also the wind is reliably deterred while still allowing the laminate to breathe.

The garments as presented result in noticeably less limitation of mobility of the wearer compared to those previously known. The garments are hardly noticed during body movements, and feel like a "second skin," in a manner of speaking, as if one were wearing just a knitted pullover or a T-shirt. For this reason they provide greatly increased wearing comfort. In particular in the design as a ski jacket or cross-country skiing jacket for the unhindered reaching-out arm movements for poling, or as a golf jacket for making unhindered clean swings when hitting the golf ball, or, for example, as a jacket for jumping riders, who must stretch both arms forward during each jump, a new dimension of freedom of movement is offered which has not been known before. As an important production engineering aspect, the garments are made up of fewer, specifically adapted parts. These parts are assembled with fewer seams than has been necessary with previous materials. Flat-warp-knitting offer tremendous freedom in designing the strength, structure, composition, and the specific properties of the parts. The flat-warp-knitted panels manufactured in a programmed manner by the machines may be precisely adapted or programmed to the desired properties. Each machine line may be programmed and operated with separate threads and stitch patterns, resulting in a large variety of patterns of flat-warp-knitted fabrics, which are variable over the course of the knitting. Manufacturing the flat-warp-knitted fabric is significantly more flexible than manufacturing woven fabric patterns, and the garments require fewer seams for assembly from such knit fabric parts. The manufacturing process is thus greatly simplified with regard to design and function, and allows many different combinations of design and function, based on the structure of the flat-warp-knitted fabric. Certain areas in the flat-warp-knitted parts to be assembled may be adapted to specific requirements, such as providing in some locations a different structure, a different strength and stress resistance, or increased vapor permeability for "breathing." However, the garments still provide similar or even better thermal insulation than woven garments, and have overall water vapor permeability. Particularly noteworthy is the advantage that such garments have significantly less mass, and are thus much lighter than those made of conventional fabrics. A ski jacket sewn together from flat-warp-knitted parts weighs approximately 1000 grams to 1500 grams, while a comparable cloth ski jacket weighs 1500 grams to 2500 grams. On average, a weight reduction of approximately 30% compared to conventional ski jackets is achieved. It is also naturally understood that such a jacket may be provided with all types of pockets and other features in a conventional manner.

LIST OF REFERENCE NUMERALS 1 individual flat-warp-knitted fabric thread
2 knitting eyelet
3 flat-warp-knitted fabric laminate
4 flat-warp-knitted fabric as outer shell of the garment
5 polyurethane film
6 knitted fabric or mesh fabric as a thermal insulation layer
7 inner lining
8 athletic jacket
9 flat-warp-knitted fabric laminate piece for the back
10 hood
11 flat-warp-knitted fabric laminate piece for right front part
12 flat-warp-knitted fabric laminate piece for left front part
13 sleeve cuffs
14 edges at the sleeve cuffs for the hole edges on the torso piece
15 hole edges of the holes for the sleeves
16 seams for front and rear parts of the torso piece
17 free edges of the front parts
18 zipper
19 Velcro fastener
20 seams for sleeve cuffs
21 seams for armhole edges 15
22 seams for shoulder area of the torso piece
23 rear side of pants
24 front side of pants
25 lateral seam along the pants legs
26 pants legs of the one-piece pants
27 extending flap at the top of the pants legs of the one-piece pants
28 seam along the middle of the seat of the one-piece pants
29 golf vest
30 location of particular restriction by a conventional riding jacket
31 cooling slits in the front sleeves

The invention claimed is:
1. A garment for wearing outdoors, the garment comprising:

a single part or multiple parts sewn together, the single part or each of the multiple parts being made of a warp-knitted fabric laminate comprising:
  a) a warp-knitted fabric, wherein the warp-knitted fabric forms an outer shell of the garment,
  b) a waterproof and vapor-permeable, adhesively bonded film which is stretchable in all directions that adjoins the warp-knitted fabric on its inner side, the adhesively bonded film having a greater stretchability than the outer shell,
  c) a thermal insulation layer optionally provided under the adhesively bonded film, and
  d) a warp-knitted inner lining coupled directly to the adhesively bonded film or the optionally provided thermal insulation layer, either detachably, or fixedly by seams or stitches, the warp-knitted inner lining having a greater stretchability than the adhesively bonded film and the outer shell.

2. The garment for wearing outdoors according to claim 1, wherein the adhesively bonded film is made of polyurethane.

3. The garment for wearing outdoors according to claim 1, wherein the warp-knitted fabric is manufactured from a polyamide/elastane fiber combination.

4. The garment for wearing outdoors according to claim 1, wherein the garment is designed as a sports jacket for skiing, cross-country skiing, mountain climbing, hiking, golfing, cycling, horseback riding, and/or for other outdoor activities, the sports jacket comprising five fitted warp-knitted fabric laminate pieces, including two warp-knitted fabric laminate pieces for a front side and one warp-knitted fabric laminate piece for a rear side of a torso part of the sports jacket, and one warp-knitted fabric laminate piece for each of two sleeves of the sports jacket, wherein the sports jacket includes:
  seams for forming the two sleeves,
  seams attaching the sleeves to one or more armholes of the sports jacket,
  seams for sewing together the front side and rear side of the torso part along one or more lateral edges of the sports jacket, and
  seams along one or more shoulders of the sports jacket.

5. The garment for wearing outdoors according to claim 4, wherein the sports jacket is equipped with a zipper or a hook and loop fastener for opening the front side of the torso part, wherein the sleeves of the sports jacket comprise one or more slits which go through the laminate and are openable to provide for cooling.

6. The garment for wearing outdoors according to claim 1, wherein the warp-knitted fabric is manufactured from at least two different polyester fibers, including normal polyester fibers and cationically dyed fibers, which assume different colors at different temperatures to produce a two-tone color effect.

7. The garment for wearing outdoors according to claim 1, further comprising the thermal insulation layer.

8. The garment for wearing outdoors according to claim 7, wherein (i) the outer shell, (ii) the adhesively bonded film, and (iii) the warp-knitted inner lining have stretching directions that are the same.

9. The garment for wearing outdoors according to claim 1, wherein the adhesively bonded film comprises a stretchable polyurethane material.

10. The garment for wearing outdoors according to claim 1, wherein the warp-knitted fabric includes one or more threads extending along the garment in a zigzag pattern across a plurality of adjacent stitch rows.

11. The garment for wearing outdoors according to claim 1, wherein an entire surface of the adhesively bonded film is coupled to the outer shell or the thermal insulation layer.

12. The garment for wearing outdoors according to claim 5, further comprising one or more spring elements for controlling an opening or a closing of the one or more slits.

13. The garment for wearing outdoors according to claim 5, further comprising a knitted air-permeable material spanning one or more openings formed in the warp-knitted fabric laminate by the one or more slits.

14. The garment for wearing outdoors according to claim 1, wherein the adhesively bonded film conforms to the warp-knitted fabric over its entire surface.

15. The garment for wearing outdoors according to claim 1, wherein the adhesively bonded film is applied to the outer shell by full-surface gluing.

16. The garment for wearing outdoors according to claim 1, wherein the warp-knitted inner lining is applied directly to the adhesively bonded film or the optionally provided thermal insulation layer by continuous sewing.

\* \* \* \* \*